United States Patent [19]

Mizuno et al.

[11] Patent Number: 4,971,567
[45] Date of Patent: Nov. 20, 1990

[54] MODULAR JACK

[75] Inventors: Tamotsu Mizuno; Yoshiro Otsuka, both of Oume, Japan

[73] Assignee: Japan Aviation Electronics Industry, Tokyo, Japan

[21] Appl. No.: 442,862

[22] Filed: Nov. 28, 1989

[30] Foreign Application Priority Data

Dec. 9, 1988 [JP] Japan ............................ 63-160092[U]

[51] Int. Cl.$^5$ ................................................ H01R 4/66
[52] U.S. Cl. ....................................... 439/98; 439/441; 439/607; 439/638
[58] Field of Search ............... 439/713, 715, 724, 725, 439/607–610, 676, 344, 535, 536, 98, 99, 460, 463, 464, 452, 438–441, 638

[56] References Cited

U.S. PATENT DOCUMENTS

| | | | |
|---|---|---|---|
| 4,133,595 | 1/1979 | Putulsky | 439/441 |
| 4,408,819 | 10/1983 | Guelden | 439/638 |
| 4,460,233 | 7/1984 | Newton et al. | 439/535 |
| 4,502,743 | 3/1985 | Zeigler | 439/98 |
| 4,655,521 | 4/1987 | Thomas | 439/460 |
| 4,790,769 | 12/1988 | Kanada | 439/536 |
| 4,875,881 | 10/1989 | Caveny et al. | 439/535 |

FOREIGN PATENT DOCUMENTS 1219558 6/1966 Fed. Rep. of Germany ...... 439/463

Primary Examiner—David L. Pirlot
Attorney, Agent, or Firm—Pollock, Vande Sande and Priddy

[57] ABSTRACT

In a modular jack which is used as an information plug socket of a home bus system an insulating body has a valley extending across the central portion of its top face, end portions of two cables to be interconnected, with their braided shielding wires exposed and turned back, are inserted in the valley from opposite directions and placed one on the other, and a shielding lug is mounted on the end portions of the cables with its legs locked on both sides of the valley. The insulating body has formed therein a plurality of housing compartments at either side of the valley and contact terminals are housed in the housing compartments. A modular block is attached to the bottom side of the insulating body and contacts of the modular block are connected to the contact terminals.

15 Claims, 9 Drawing Sheets

MODULAR JACK

BACKGROUND OF THE INVENTION

The present invention relates to a modular jack which is used in an information plug socket of a home bus system, for example.

In conventional home bus systems formed by wiring a house for transmitting and receiving various pieces of information in the house, there has been used a modular block 2 which has a terminal block 5 on its back as shown in FIG. 1 for connecting shielding wires of two cables and their signal wires.

As depicted in FIG. 1, the terminal block 5 is mounted on the back of the modular block 2 which is mounted on a frame 1 and receives a modular plug through a front window (not seen) of the frame 1, and screws 3 for shielding wires and screws 4 for signal wires are attached to the terminal block 5, the frame 1 bearing indications of terminal numbers corresponding to the screws 4. The screws 4 are electrically connected to the corresponding contacts (not shown) housed in the modular block 2. The braided shielding wires of two terminal-treated cables are interconnected by winding their lead portions around each screw 3 and then tightening it, and a total of 16 signal wires of the two cables in this example are interconnected in pairs by winding each pair of signal wires to be connected serially around the corresponding one of the screws 4 and then tightening the screw 4.

With such a conventional modular jack as shown in FIG. 1, however, lead portions of the shielding wires and the signal wires must be wound, one by one, around the screws 3 and 4 and then fixed by tightening the screws 3 and 4 one after another. Hence, the prior art modular jack possesses disadvantages of requiring a large number of man-hours and much labor for connecting the shielding wires and the signal wires and of cumbersome work in disconnecting them for reconnection, for example, in case of a wiring error. In addition, the cables are not stably held, because they are not fastened to the modular jack over their entire end portions, and the connections of the shielding wires and the signal wires may sometimes be unstable or insecure owing to insufficient tightening of the screws 3 and 4 or a failure of tightening them.

SUMMARY OF THE INVENTION

An object of the present invention is to provide a modular jack for use in an information plug socket of a home bus system, for instance, which permits easy, stable and sure connection of shielding wires and signal wires of cables, allows ease in disconnecting them for reconnection as in case of erroneous wiring, ensures stable holding of the cables, consumes less space, and uses a small number of parts and hence is low-cost.

According to an aspect of the present invention, the modular jack includes an insulating body, a shielding lug, a plurality of contact terminals, and a modular block. The insulating body is substantially rectangular parallelepipedic in shape and has a U-shaped valley extending across the central portion of one face thereof and locking stepped portions formed in both side walls of the valley. End portions of two cables, each having braided shielding wires, are stacked in the valley, with their free ends disposed in opposite directions. The shielding lug has a substantially rectangular panel and legs extending from four corners of the panel substantially vertically thereto. Each leg has a locking-portion formed at its tip. The shielding lug is fitted into the valley astride the end portions of the two cables stacked therein, with the legs of the shielding lug guided down the two side walls of the valley, and then the locking portions of the legs are locked to the aforementioned stepped portions formed in both side walls of the valley. Thus, the end portions of the two cables are firmly pressed by the panel of the shielding lug. The contact terminals are each incorporated into the insulating body for interconnecting the signal wires of the two cables. The modular block has housed therein a plurality of pin contacts and has an opening for receiving the mating plug. The modular block is mounted on the insulating body on the opposite side from the valley. The pin contacts are connected to the contact terminals, respectively.

According to another aspect of the present invention, the modular jack includes an insulating block, a plurality of contact terminals, and a modular block. The contact terminals each have a pair of unitary-structured contact portions arranged side by side, into which two signal wires of two cables are inserted for serial connection. The contact terminals are incorporated into the insulating body. The modular block is to receive the mating modular plug and is mounted on the insulating body and connected to the contact terminals.

In the above modular jack, each contact terminal includes a pair of movable spring pieces coupled together at their bases, a pair of receiving spring pieces also coupled together at their bases, and a pair of bottom portions through which the movable spring piece coupling portion and the receiving spring piece coupling portion are formed as a unitary structure. The pair of movable spring pieces have their free end portions bent in a U-shape so that their free end edges are held in contact with the receiving spring pieces at one side thereof for resiliently holding signal wires therebetween. A drive spring piece is provided between the pair of receiving spring pieces and the free end portion is bent in a U-shape so that its free end is adjacent but spaced from lugs protrusively provided on the inner marginal edges of the free end portions of the movable spring pieces. Each contact terminal has a terminal portion formed between the pair of bottom portions and extending in a direction reverse from the drive spring piece.

According to still another aspect of the present invention, the modular jack includes an insulating body, a plurality of contact terminals, a plurality of insulating covers, and a modular block. The insulating body has in its one face a plurality of through holes through which signal wires of two cables are connected in pairs to the plurality of contact terminals incorporated in the insulating body. Each insulating cover is adapted to be slidable on the insulating body along its said one face and has elongated holes through which the signal wires are inserted into the through holes of the insulating body. The insulating cover is mounted on the said one face of the insulating body, with the signal wires connected to the contact terminals through the elongated holes and the through holes, and when slid on the insulating body to a lock position, the insulating cover firmly grips the signal wires in its elongated holes and is locked to the insulating body. The modular block is to receive the mating modular plug and is mounted on the insulating body on the opposite side from the above-mentioned face and connected to the contact terminals.

In the above modular jack, provision is made for a contact-releasing portion of the insulating cover to release contact portions of the contact terminals simply by pressing the insulating cover to the insulating body after returning the insulating cover to its initial position on the insulating body where the signal wires were connected to the contact terminals through the elongated holes of the insulating cover and the through holes of the insulating body. The insulating covers are each formed of transparent resin.

In the modular jack of the present invention, by simply fitting the shielding lug into the valley of the insulating body after stacking the end portions of the two cables inserted into the valley from reverse directions, the end portions of the cables are pinched between the panel of the insulating cover and the bottom of the valley and are held in position stably and with certainty, and at the same time the braided shielding wires of the two cables are contacted with sufficient contact pressure and hence are interconnected stably and surely.

In the modular jack according to the second aspect of the present invention, two signal wires of two cables to be connected serially are interconnected stably and with certainty by simply inserting them between a pair of contact portions of the same contact terminals.

In the modular jack according to the third aspect of the present invention, by sliding the insulating cover on the insulating body after connecting the signal wires of the cables to the contact terminals through the elongated holes of the insulating cover and the through holes of the insulating body, the insulating cover firmly grips the coated portions of the signal wires and is locked to the insulating body. Hence, the signal wires are stably and surely held by the insulating cover and the insulating body and are connected to the contact terminals.

DESCRIPTION OF THE PREFERRED EMBODIMENTS

Figure 1:
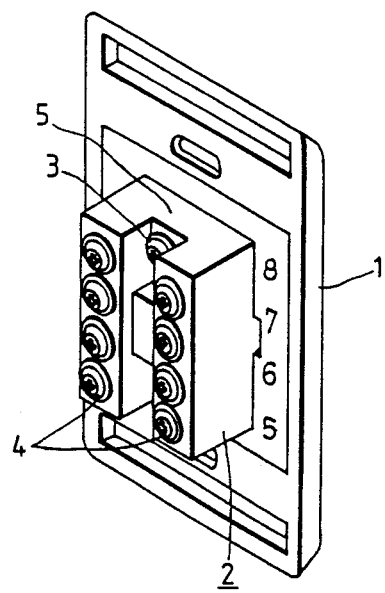
FIG. 1 is a perspective view showing the principal part of an example of a conventional modular jack.
Figure 3:
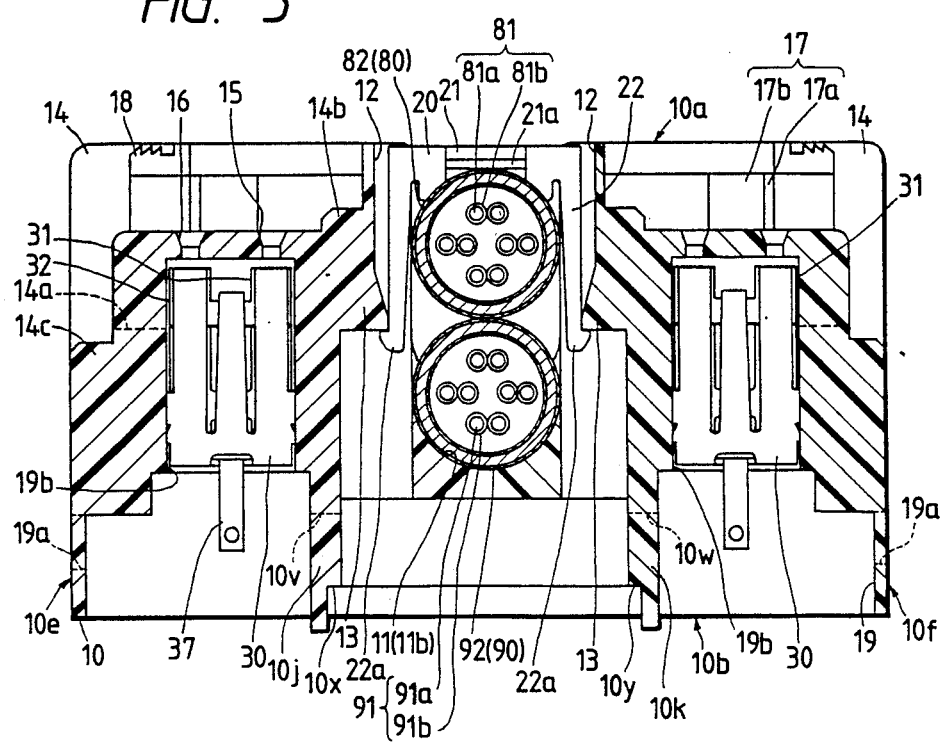
FIG. 3 is a longitudinal-sectional view of the modular jack of the present invention with two cables held in an insulating body.
Figure 2:
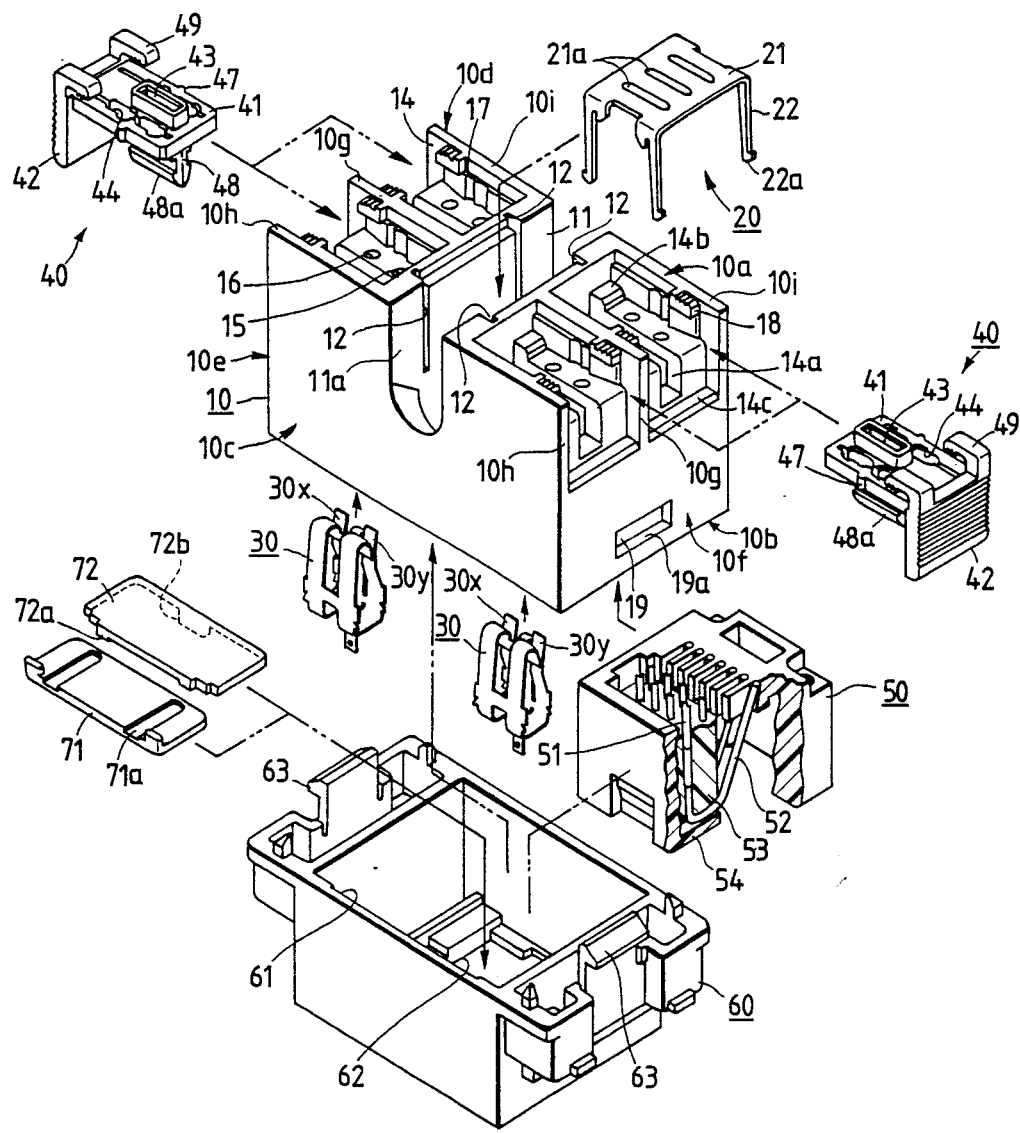
FIG. 2 is an exploded perspective view illustrating an embodiment of the modular jack of the present invention.
Figure 4:
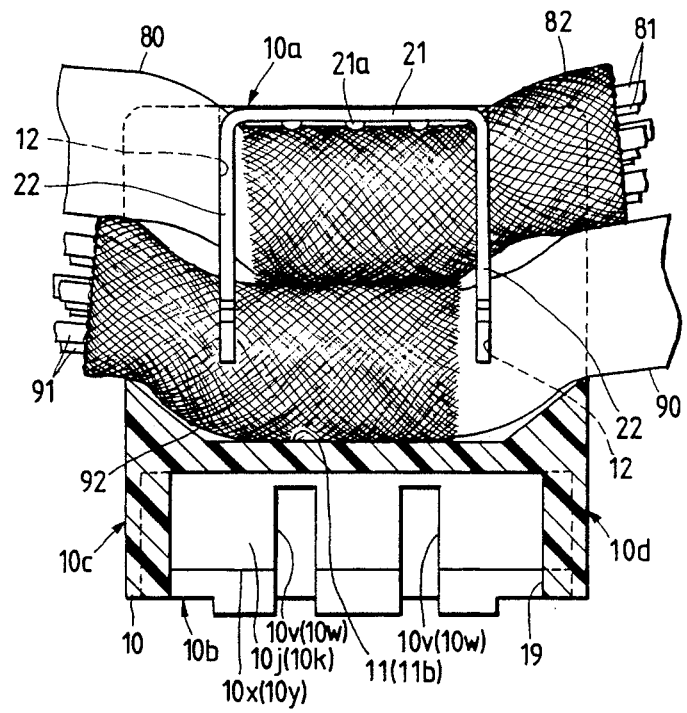
FIG. 4 is a cross-sectional view of FIG. 3.
Figure 5:
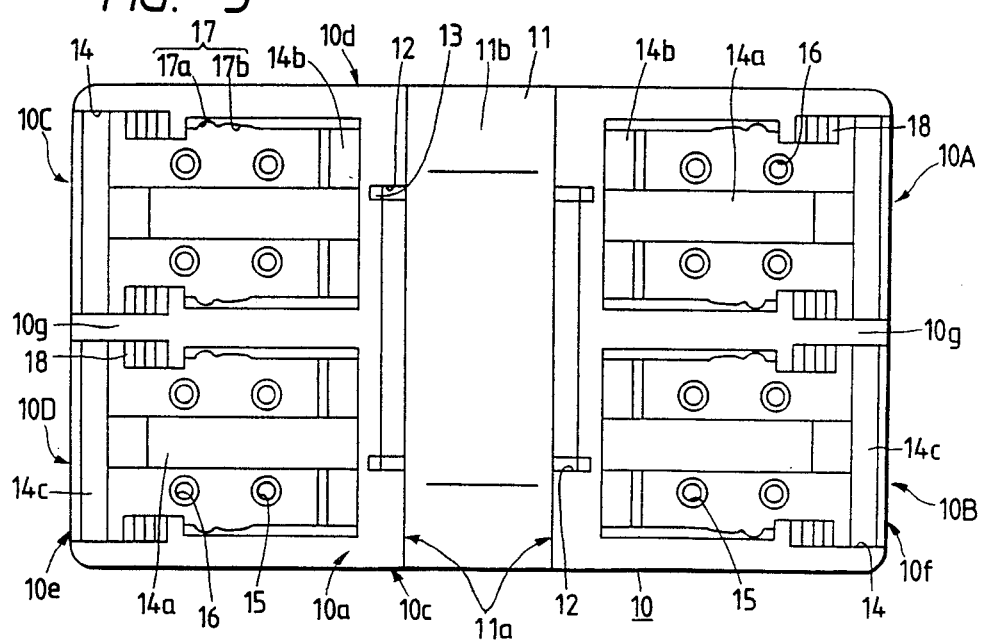
FIG. 5 is a plan view of the insulating body.
Figure 6:
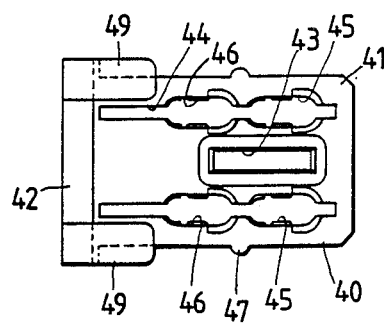
FIG. 6 is a plan view of an insulating cover.
Figure 7:
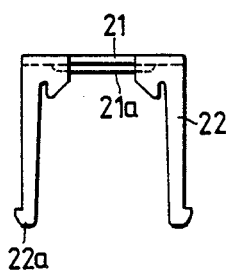
FIG. 7 is a side view of a shielding lug.
Figure 8:
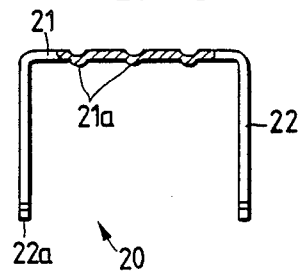
FIG. 8 is a sectional view.
Figure 9:
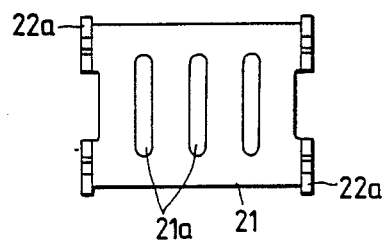
FIG. 9 is a bottom view.

FIG. 2 is an exploded view of the modular jack of the present invention, FIG. 3 is a longitudinal-sectional view of an insulating body 10, FIG. 4 its cross-sectional view, and FIG. 5 its plan view.

The modular jack of this embodiment comprises the insulating body 10, a shielding lug 20, contact terminals 30, insulating covers 40, a modular block 50, a modular cover 60, and dust covers 71 and 72 as shown in FIG. 2. In this embodiment, two cables 80 and 90 to be connected as home buses have eight signal lines 81 and 91, respectively, as depicted in FIGS. 3 and 4, and eight contact terminals 30 are provided although only two of them are shown in FIG. 2. Further, four insulating covers 40 are provided although only two of them are shown in FIG. 2.

The cables 80 and 90 have their end portions treated. At their end portions the signal lines 81 and 91 are exposed over a required length and their conductors 81a and 91a are also exposed over a required length, braided shielding wires 82 and 92 being turned back on the outside thereof. Covers 81b and 91b of the signals lines 81 and 91 are colored in different tints so that each pair of signal wires 81 and 91 to be connected serially are of the same color, and the signal lines 81 and 91 are connected in pairs accordingly.

The insulating body 10 is substantially a rectangular parallelepiped as shown in FIG. 2 and has a valley 11 of a U-shaped cross section which extends across its face 10a (hereinafter referred to as the top face) centrally thereof from one side 10c to the opposite side 10d. The valley 11 has a width about the same as the diameter of the cable 80 or 90 and a depth about twice the width. Both side wall surfaces 11a of the valley 11 have cut therein two pairs of opposed vertical guide grooves 12, the lower end faces of which form locking stepped portions 13 as depicted in FIG. 3. Both side marginal portions of the bottom 11b of the valley 11, contiguous to the both sides 10c and 10d of the insulating body 10, slope inwards so that the valley 11 becomes deeper as the center of its bottom 11b is approached, as shown in FIG. 4.

Further, the insulating body 10 has, on both sides of the valley 11, a total of four sections 10A through 10D separated by partition walls 10g as shown in FIGS. 2 and 5. Each section has a recess 14 open 10 to the top face 10a and the side 10e or 10f of the insulating body 10 as depicted in FIGS. 2, 3 and 5. In the insulating body 10 there is formed a slot 14a which extends centrally of each recess 14 in parallel with the both sides 10c and 10d of the insulating body 10. In each recess 14 there are provided stepped portions 14b and 14c at positions nearest to and farthest from the valley 11, respectively.

The insulating body 10 has, in each of the sections 10A through 10D through holes 15 and 16 for receiving the signal lines 81 or 91 of the cable 80 or 90, which are arranged in double file on both sides of the slot 14a in the widthwise direction of the valley 11. Under each section there is provided in the insulating body 10 a substantially rectangular parallelepipedic contact-terminal housing compartment 19b disposed on either side of the slot 14a and communicating therewith as shown in FIG. 16.

In each of the above-mentioned sections 10A through 10D of the insulating body 10 there are formed on the wall surfaces of the partition wall 10g and the side wall 10h or 10i opposed to each other across the recess 14 sliding guide depressions 17, each composed of a gutter-shaped depression 17a of a semi-columnar cross-section and a shallower and wider depression 17b contiguous thereto and spreading toward the valley 11. Protrusively provided adjacent the sliding guide depressions 17, but farther from the valley 11, are sawtooth engaging protrusions 18 which are contiguous to the top face 10a of the insulating body 10.

Figure 16:
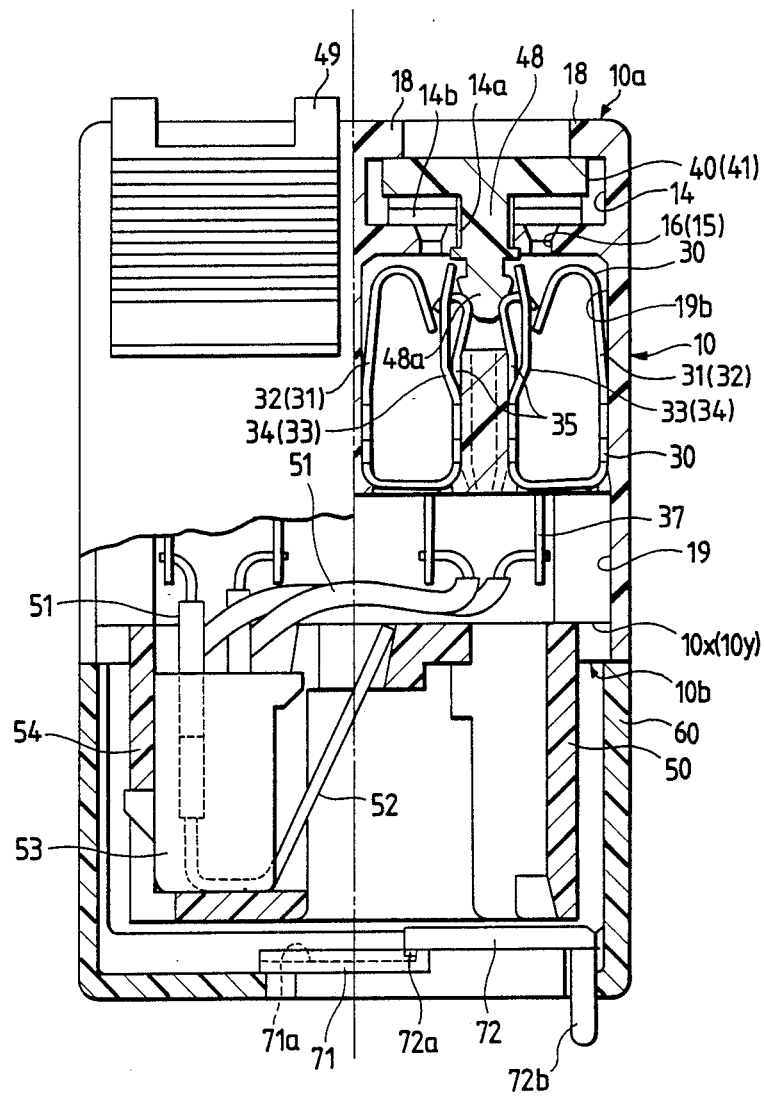
FIG. 16 is a sectional view of the modular block with the contact terminals incorporated in the insulating body.

As depicted in FIGS. 2 and 16, the insulating body 10 has an opening 19 in its bottom 10b for housing leads 51 which interconnect the modular block 50 and the contact terminals 30, and as shown in FIG. 2, there are holes 19a in the sides 10e and 10f which lead to the opening 19. The opening 19 is partitioned by a pair of opposed support walls 10j and 10k, which have stepped portions 10x and 10y for fixedly holding the modular block 50 between the support walls 10j and 10k. Further, the support walls 10j and 10k have windows 10v and 10w for passing therethrough the leads 51 as depicted in FIG. 4.

Figure 10:
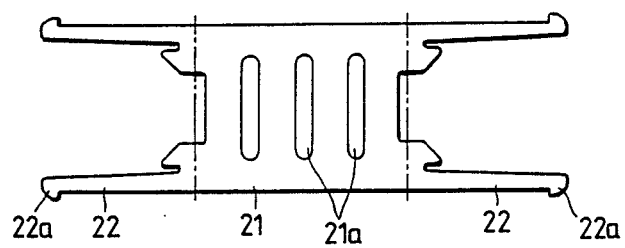
FIG. 10 is a plan view of the shielding lug prior to its bending.
Figure 11:
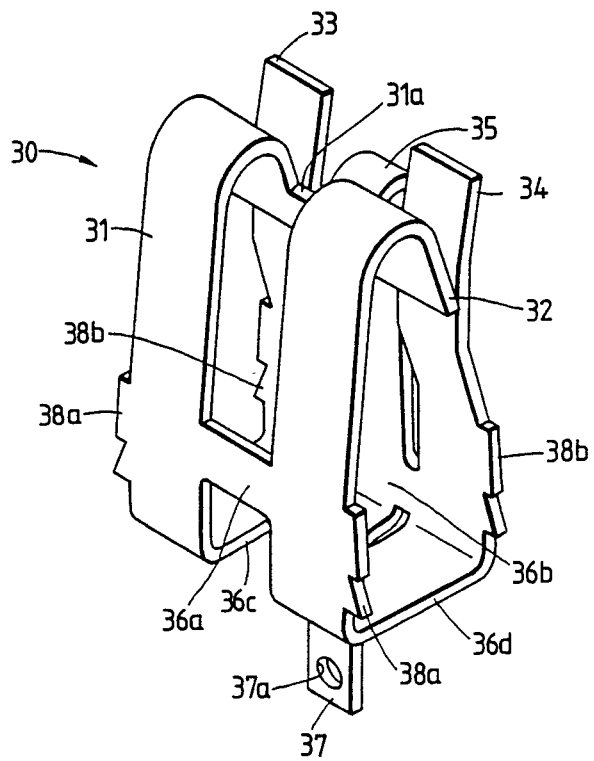
FIG. 11 is a perspective view of a contact terminal.
Figure 12:
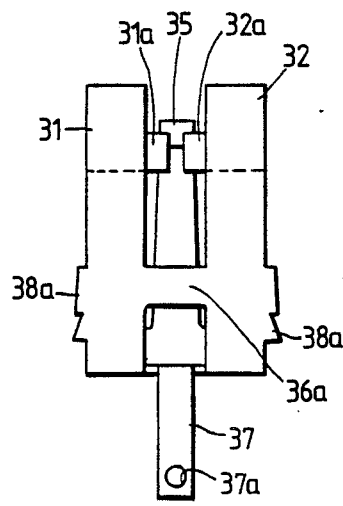
FIG. 12 is a one side view thereof.
Figure 13:
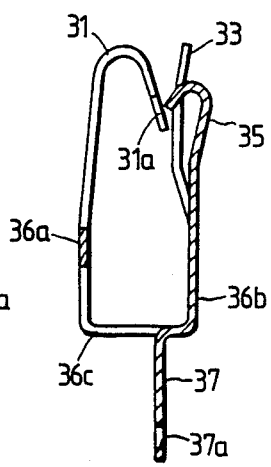
FIG. 13 is a sectional view thereof.
Figure 14:
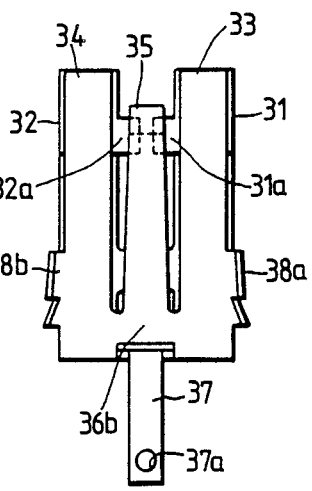
FIG. 14 is the other side view thereof.

The shielding lug 20 is composed of a rectangular plate portion 21, legs 22 formed integrally therewith and extending down from its four corners substantially vertically thereto, three inwardly protruding ridges 21a made in the plate portion 21 in side-by-side relation, and locking pawls 22a each protruding outwardly of the tip of each leg 22 as shown in FIGS. 2, 3, 4, 7, 8 and 9. The shielding lug 20 is formed by bending an H-shaped punched metallic plate along the chain lines in FIG. 10. The shielding lug 20 is mounted on the insulating body 20 as described later.

As mentioned previously, eight contact terminals 30 are used, each of which has a pair of contact portions 30x and 30y integrally formed with each other in side-by-side relation for receiving a pair of corresponding signal lines 81 and 91 of the cables 80 and 90 which are to be serially connected.

More specifically, the contact terminals 30 each have a single unitary structure, such as depicted in FIGS. 11, 12, 13 and 14, which comprises a pair of movable spring pieces 31 and 32 arranged side by side, a pair of receiving spring pieces 33 and 34 also arranged side by side, a drive spring piece 35 disposed between the receiving spring pieces 33 and 34, a coupling portion 36a coupling the movable spring pieces 33 and 34, a coupling portion 36b coupling the receiving spring pieces 33 and 34 and the drive spring piece 35, a pair of bottom portions 36c and 36d, and a terminal portion 37 extending from the coupling portion 36b in a direction reverse from the drive spring piece 35. The pair of movable spring pieces 31 and 32 have their free end portions bent into a U-shape and have lugs 31a and 32a extending toward each other from inner marginal edges of their free end portions, respectively. The pair of receiving spring pieces 33 and 34 have their free end portions held opposite the free ends of the movable spring pieces 31 and 32, respectively. The drive spring piece 35 has its free end portion bend into a U-shape so that its tip is held adjacent the lugs 31a and 32a of the movable spring pieces 31 and 32. The width of the tip of the drive spring piece 35 is larger than the gap between the lugs 31a and 32a. By pressing the lugs 31a and 32a with the drive spring piece 35, the tip end portions of the movable spring pieces 31 and 32 can be pushed apart from the receiving spring pieces 33 and 34. The bottom portions 36c and 36d are positioned on both sides of the drive spring piece 35 and are each bent into an L-shape. The terminal portion 37 is disposed between the bottom portions 36c and 36d and has a hole 37a made in its lower end portion. Each of the movable spring pieces 31 and 32 has a press-in portion 38a protruding from its outer marginal edge laterally of the movable spring piece coupling portion 36a, and each of the receiving spring pieces 33 and 34 also has a similar press-in portion 38b in the vicinity of the receiving spring piece coupling portion 36b.

Figure 15:
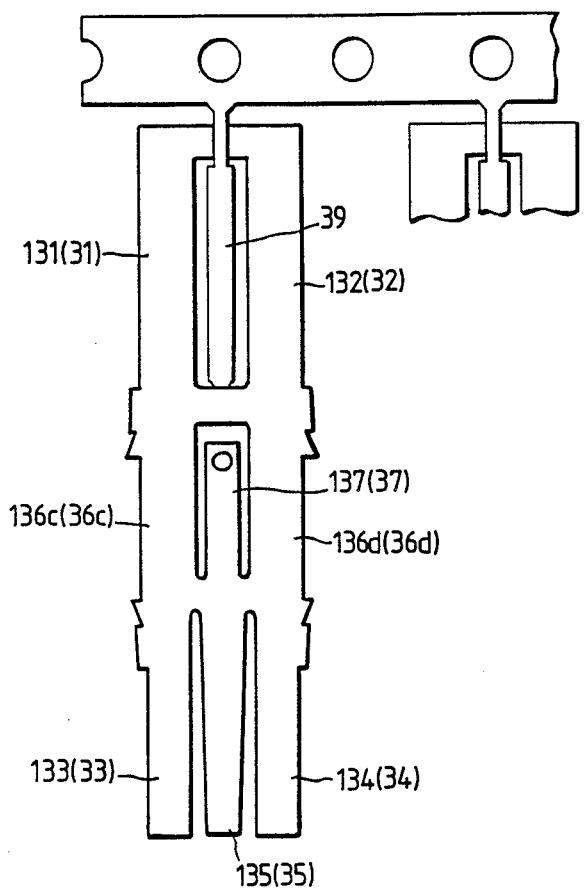
FIG. 15 is a plan view of the contact terminal prior to its bending.

The contact terminals 30 of the above structure are obtained by simultaneously punching them out of a metallic plate and bending them. In this instance, as depicted in FIG. 15, a portion 135 which will form the drive spring piece 35 can be formed between portions 133 and 134 which will form the pair of receiving spring pieces 33 and 34, a portion 137 which will form the terminal portion 37 can be formed between portions 136c and 136d which will form the pair of bottom portions 36c and 36d, and a carrier portion can be formed between portions 131 and 132 which will form the pair of movable spring pieces 31 and 32. This avoids waste of the material used, and hence affords reduction of the manufacturing costs of the contact terminals 30.

The contact terminals 30 are disposed in pairs in the aforementioned sections 10A through 10D of the insulating body 10 as depicted in FIG. 16; that is, contact terminals 30 of each pair are pressed into the housing compartments 19b of the insulating body 10 from underneath, with the drive spring pieces 35 disposed back to back and the free end portion of each of the movable spring pieces 31 and 32 positioned just under the through hole 15 or 16 of the insulating body 10.

The insulating covers 40 are each mounted in one of the four sections 10A through 10D of the insulating body 10. Each insulating cover 40 is an L-shaped molding of transparent resin, which includes rectangular plate portions 41 and 42 perpendicular to each other. The plate portion 41 has a slot 43 which extends lengthwise along its center line and into which the tip of a driver, for instance, is pressed when the insulating cover 40 is mounted on or dismounted from the insulating body 10 or when the signal lines 81 and 91 are pulled out thereof as described later. The plate portion 41 further has at either side of the slot 43 a pair of elongated holes 45 and 46 which extend lengthwise along one side of the plate portion 41 parallel thereto, and a slit 44 which extends across the elongated holes 45 and 46 lengthwise thereof along one side of the plate portion 41 parallel thereto. The widths of the elongated holes 45 and 46 in the direction parallel to the valley 11 are about the same as the diameters of the signal lines 81 and 91 and their lengths in the direction perpendicular to the valley 11 are larger than the latter. The widths of the slits 44 are smaller than the diameters of the signal lines 81 and 91.

The plate portion 41 has semi-circular lugs 47 protrusively provided on its two sides so that the elongated holes 45 and 46 become narrower when the lugs 47 are pressed. As shown in FIG. 2, the plate portion 41 has a plate-like leg portion 48 which extends down from its underside and lengthwise along its center in parallel to its two sides, and the lower end portion of the leg 48 forms a contact-releasing portion 48a of a triangular cross-section. Engaging arms 49 extend in parallel to the plate portion 41 from both sides of the upper end of the plate portion 42 where it is coupled to the plate portion 41, and the underside of the free end portion of each arm 49 is sawtooth.

Figure 18:
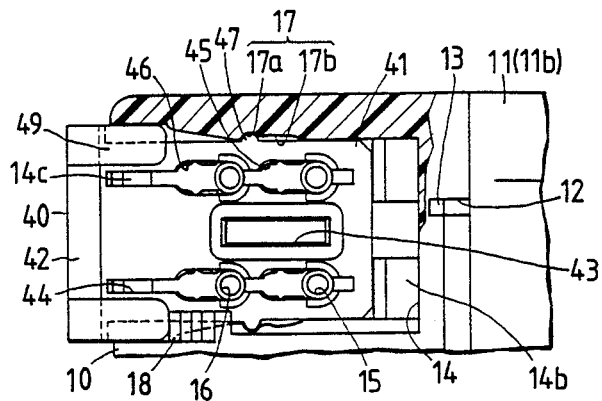
FIG. 18 is a plan view showing the positional relationship between the insulating cover and the insulating body at the time of inserting signal wires thereinto for interconnection.
Figure 19:
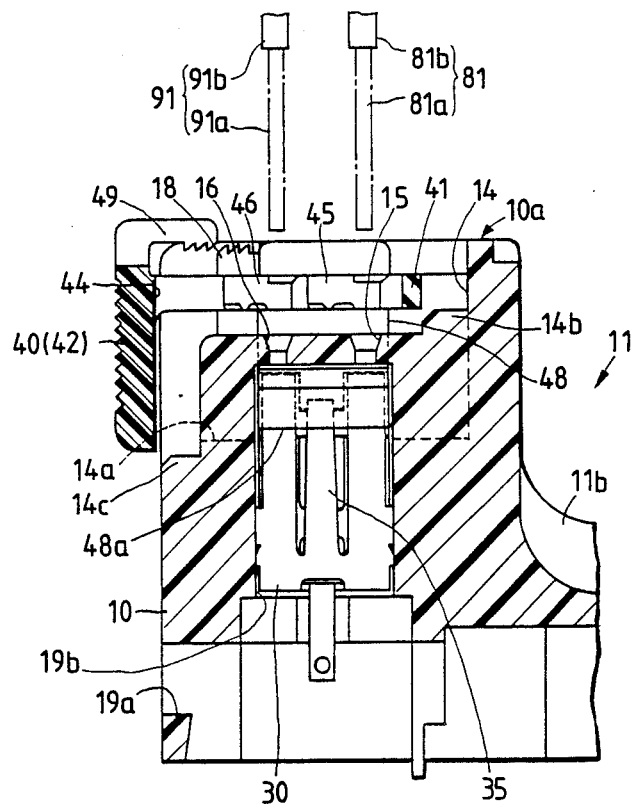
FIG. 19 is a sectional view of FIG. 18.

An insulating cover 40 having the above structure is mounted in the recess 14 of each of the sections 10A through 10D of the insulating body 10, with the leg portion 48 inserted into the slot 14a of the recess 14 from its outer open end. In this instance, as shown in FIGS. 18 and 19, the inner end portions of the elongated holes 45 and 46 lie just above the through holes 15 and 16, and the lugs 47 are fitted into the semi-circular depressions 17a of the guide depressions 17 of the insulating body 10.

The modular block 50 is a means by which a modular plug is attached to or detached from the insulating body 10. The modular block 50 comprises, as shown partly in section in FIG. 2, an insulating block 53 for holding pin contacts 52 connected to the eight leads 51 and a substantially parallelepipedic housing 54 for receiving the insulating block 53. This structure is basically identical with that of a conventional telephone modular jack. As depicted in FIG. 16, the modular block 50 is attached to the underside 10b of the insulating body 10 and the leads 51 are inserted into the aforementioned holes 37a of the terminal portions 37 of the contact terminals 30 and soldered thereto.

The modular cover 60 is box-shaped as shown in FIG. 2 and open at the top as indicated by 61 and has a window 62 in the bottom and engaging pieces 63 on both sides of the box-shaped body near the open top end. By fitting the engaging pieces 63 into the holes 19a from the inside of the opening 19 of the insulating body 10, the modular cover 60 is fixedly mounted on the bottom 10b side of the insulating body 10, covering the modular block 50.

Figure 17:
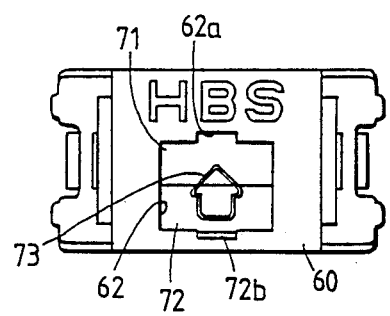
FIG. 17 is a front view of a modular cover.

The dust covers 71 and 72 are disposed in the modular cover 60 so that they cover the window 62 made in the bottom of the modular cover 60. The dust cover 71 has guide grooves 71a made in its inner surface, whereas the dust cover 72 has in its outer surface a pair of protrusions 72a which are slidably engaged with the guide grooves 71a of the dust cover 71. As depicted in FIG. 17, an arrow 73 is drawn over the outer surfaces of the dust covers 71 and 72 to indicate the direction in which to move them, and as shown in FIG. 16, the dust cover 72 has a lug 72b protrusively provided on its outer surface. By moving the dust cover 72 in the direction of the arrow 73 with a finger held on the lug 72b until the lug 72b strikes against one marginal edge of the dust cover 71, one half of the window 62 of the modular cover 60 is opened. By further moving the dust cover 72 in the direction of the arrow 73 together with the dust cover 71 until the lug 72b strikes against an edge 62a of the window 62, the window 62 is fully opened full, through which the mating modular plug is attached to or detached from the modular block 50.

After incorporating the contact terminals 30 into the insulating body 10, attaching the modular block 50 to the insulating body 10, connecting the leads 51 to the contact terminals 30, attaching the modular cover 60 with the dust covers 71 and 72 disposed therein to the insulating body 10, and mounting the insulating covers 40 onto the insulating body 10 as described above, the two cables 80 and 90 are mounted on the insulating body 10, their shielding wires 82 and 92 are connected together, the signal lines 81 and 91 of the cables 80 and 90 are connected to the contact terminals 30, and then the shielding lug 20 is mounted on the insulating body 10 as described below.

As shown in FIGS. 3 and 4, the exposed end portions of the cables 80 and 90 are inserted into the valley 11 of the insulating body 10 from its sides 10c and 10d, respectively, i.e. from opposite directions so that they are disposed one on the other in the valley 11 with their shielding wires 82 and 92 held in contact with each other. Then, the shielding lug 20 is fitted into the valley 11 of the insulating body 10 from above the stacked cables 80 and 90 by guiding the legs 22 of the shielding lugs 20 down along the guide grooves 12 of the insulating body 10 until the pawls 22a of the legs 20 are locked to the stepped portions 13 of the insulating body 10.

As a result of this, the exposed end portions of the cables 80 and 90 are stably and surely held between the top panel 21 of the shielding lug 20 and the bottom 11b of the valley 11 of the insulating body 10, and at the same time, the shielding wires 82 and 92 of the cables 80 and 90 are contacted with a sufficient contact pressure and hence connected together stably and surely. The ribs 21a of the top panel 21 reinforce it and, at the same time, urge the exposed end portions of the cables 80 and 90 against the bottom 11a of the valley 11.

By the simple step of mounting the shielding lug 20 onto the insulating body 10 after inserting the exposed end portions of the cables 80 and 90 into the valley 11 of the insulating body 10, it is possible to hold the cables 80 and 90 on the insulating body 10 and interconnect their shielding wires 82 and 92 stably and with certainty. Besides, since the exposed end portions of the cables 80 and 90 are essentially confined in the valley 11 of the insulating body 10 and do not appreciably stick out therefrom, the modular jack of the present invention occupies less space.

Now, a description will be given of connection and loading of the signal lines 81 and 91 of the cables 80 and 90. After each insulating cover 40 is mounted on the insulating body 10 in such a manner that the fore parts of the elongated holes 45 and 46 of the insulating cover 40 lie above the through holes 15 and 16 of the insulating body 10 and the protrusions 47 of the insulating cover 40 engage the semi-circular depressions 17a of the guide depressions 17 of the insulating body 10 as shown in FIGS. 18 and 19, two signal lines 81 and 91 to be serially connected are passed through the elongated holes 45 and 46 of the insulating cover 40 and the through holes 15 and 16 of the insulating body 10 and then conductor portions 81a and 91a of the signal lines 81 and 91 are inserted into and connected to the aforementioned contact portions 30x and 30y of the contact terminal 30.

As is evident from FIGS. 16 and 19, the conductor portions 81a and 91a of the signal lines 81 and 91 are guided and held between the tips of the movable spring pieces 31 and 32 and the inner surfaces of the receiving spring pieces 33 and 34 of the contact terminal 30, respectively, though not shown. Thus, the two signal lines 81 and 91 to be serially connected are interconnected via the contact terminal 30.

Figure 20:
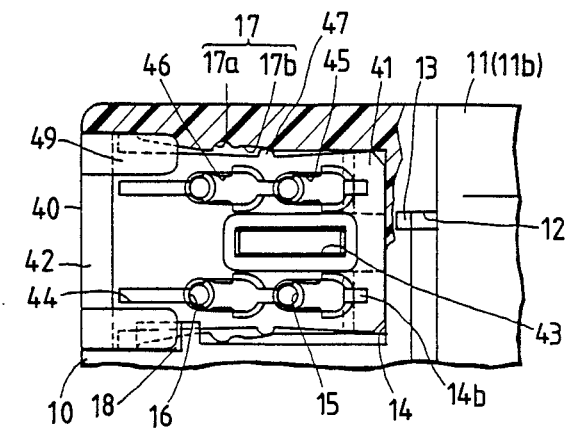
FIG. 20 is a plan view showing the positional relationship between the insulating cover and the insulating body when the signal wires are being firmly held by them.
Figure 21:
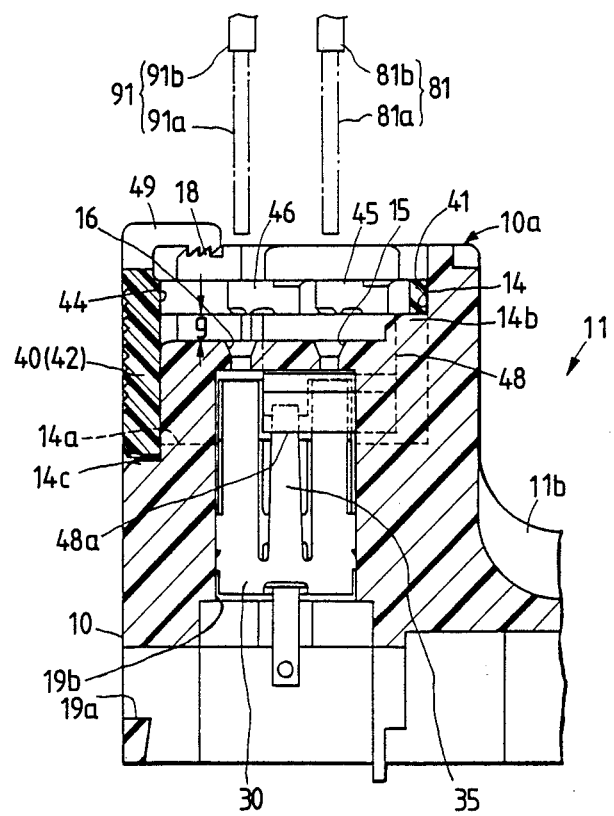
FIG. 21 is a sectional view of FIG. 20.

Next, the insulating cover 40 thus mounted on the insulating body 10 is pushed toward the valley 11 to slide on the insulating body 10 until the end face of the top panel 41 of the insulating cover 40 runs against the inner wall of the recess 14 near the valley 11, that is, to the position where the hind parts of the elongated holes 45 and 46 of the insulating cover lie above the through holes 15 and 16 of the insulating body 10 and the protrusions 47 of the insulating cover 40 lie at the extremities of the shallower depressions 17b of the guide depressions 17 as depicted in FIGS. 20 and 21.

In this instance, the central parts of the slits 44 of the insulating cover 40 lengthwise thereof are narrowed to thereby hold coated portions 81b and 91b of the signal lines 81 and 91 in the hind parts of the elongated holes 45 and 46 of the insulating cover 40, and the sawtooth engaging arms 49 of the insulating cover 40 are engaged with the sawtooth engaging protrusions 18, locking the insulating cover 40 to the insulating body 10. Consequently, there is no possibility of the signal lines 81 and 91 disengaging from the contact terminal 30 and comming out of the insulating body 10 and the insulating cover 40. Incidentally, since in this state the front end portion of the top panel 41 of the insulating cover 40 rests on the stepped portion 14b made in the recess 14 and the lower end portion of the side panel 42 abuts against the stepped portion 14c as shown in FIG. 21, a gap g is defined between the underside of the top panel 41 and the bottom of the recess 14. In this case, even if the top panel 41 is pressed down, the gap g is maintained and does not allow downward movement of the contact releasing portion 48a (see FIG. 16), and consequently, the drive spring piece 35 is not urged laterally. Accordingly, there is no fear of the conductors 81a and 91a pinched between the movable spring pieces 31 and 32 and the receiving spring pieces 33 and 34 being disengaged therefrom.

By the simple step of sliding the insulating cover 40 on the insulating body 10 as mentioned above after passing the signal lines 81 and 91 through the elongated holes 45 and 46 of the insulating cover 40 and the through holes 15 and 16 of the insulating body 10 and connecting them to the contact terminal 30 in the state in which the insulating cover 40 is in position on the insulating body 10, the signal lines 81 and 91 can be secured to the insulating cover 40 and the insulating body 10 stably and with certainty, and pairs of signal lines to be serially connected can be interconnected via the contact terminals 30 stably and with certainty. Moreover, since the insulating cover 40 is made of transparent resin, the signal lines 81 and 91 can be connected and loaded accurately and rapidly while eye-checking the through holes 14 and 16 of the insulating body 10 and the contact terminals 30 through the insulating cover 40 from the outside thereof.

Next, a description will be given of the procedure for removing the signal wires 81 and 91 from the contact terminal 20, the insulating body 10 and the insulating cover 40, as required, in the case of correcting a wiring error, for instance. The procedure begins with pushing the insulating cover 40 away from the valley 11 of the insulating body 10, with the tip of a driver inserted in the slot 43 of the insulating cover 40, for example, until the insulating cover 40 slides on the insulating body 10, while disengaging the engaging arms 49 of the former from the engaging protrusions 18 of the latter and hence unlocking the former from the latter, to the position where the fore parts of the elongated holes 45 and 46 of the insulating cover 40 lie above the through holes 15 and 16 of the insulating body 10 and the protrusions 47 engage the semi-circular recessed portions 17a of the guide depressions 17 of the insulating body 10 as shown in FIGS. 18 and 19, that is, to the position where the signal wires 81 and 91 were initially passed through the elongated holes 45 and 46 and the through holes 15 and 16 and connected to each contact terminal 30. As a result of this, the slits 44 are restored to their initial widths, loosening the grip of the signal wires 81 and 91 by the elongated holes 45 and 46. Then, by pressing the top panel 41 of the insulating cover 40 down to the bottom of the recess 14 of the insulating body 10, the contact releasing portion 48a of the insulating cover 40 is pressed down, urging the bent portions of the drive spring pieces 35 of the opposed contact terminals 30 toward their movable spring pieces 31 and 32 as will be seen from FIG. 16. Consequently, the tip of each drive spring piece 35 pushes the lugs 31a and 32a of the pair of movable spring pieces 31 and 32 away from the pair of receiving spring pieces 33 and 34, spacing them apart sufficiently for pulling out the conductors 81a and 91a of the signal wires 81 and 91 from the contact terminal 30 with ease.

By the simple step of depressing the insulating cover 40 from above after sliding it away from the valley 11 of the insulating body 10, the signal wires 81 and 91 can easily be removed from the contact terminals 30, the insulating body 10 and the insulating cover 40. Furthermore, since the insulating cover 40 is made of transparent resin, it is possible to carry out the insertion and extraction of the signal wires 81 and 91 rapidly and with certainty while visually observing the through holes 15 and 16 of the insulating body 10 and the contact terminals 30 through the insulating cover 10 from the outside thereof.

Incidentally, when the coated portions 81b and 91b of the signal wires 81 and 91 are being held by the insulating cover 40, the front edge of the top panel 41 of the insulating cover 40 rests on the stepped portion 14b of the insulating body 10 and the side panel 42 of the insulating cover 40 abuts against the stepped portion 14c of the insulating body 40 as depicted in FIG. 21. Consequently, even if the insulating cover 40 is pressed from above inadvertently, it will not be depressed, and hence the contact portions 30x and 30y of the contact terminals 30 will not be released by the contact releasing portion 48a.

Although in the above embodiment the insulating body 10 is divided into four sections and four insulating covers 10 are provided correspondingly, it is also possible to employ, when the cables 80 and 90 each have eight signal wires 81 or 91 as in the embodiment described above, a structure in which the numbers of sections of the insulating body 10 and the insulating covers 40 are each two, one at each side of the valley 11 or the numbers of sections and insulating covers are each eight, four at each side of the valley 11. In the former case, the number of parts used is small but an appreciable amount of force is needed for manipulating each insulating cover 40, whereas in the latter case, the force for the insulating cover 40 is small but the number of parts used is large. In the above embodiment which employs four insulating covers 40, the number of parts is not so large and no large amount of force is needed for manipulating each insulating cover 40.

While in the above the terminal portion 37 of the contact terminal 30 has been described to have an eyelet terminal structure, it may also have a solderless terminal structure so that the lead 51 of the modular block 50 is pressed into contact therewith.

It will be apparent that many modifications and variations may be effected without departing from the scope of the novel concepts of the present invention.

What is claimed is:

1. A modular jack comprising:
    a substantially rectangular parallelepipedic insulating body which has a valley formed in one face thereof across the central portion thereof for housing stacked end portions of two cables to be interconnected, and at least one pair of locking means formed at either side of said valley;
    a metal shielding lug which includes a rectangular plate portion of about the same width as that of said valley and at least one pair of legs extending from both ends of said plate portion substantially at right angles thereto, said legs including engaging means for engagement with said locking means;
    a plurality of contact terminals each incorporated in one of a plurality of housing compartments formed in said insulating body on both sides of said valley, for interconnecting at least two signal lines of said two cables; and
    a modular block attached to another face of said insulating body and having housed therein a plurality of contacts connected to said contact terminals and receiving the mating modular plug.

2. The modular jack of claim 1 wherein the depth of said valley is about twice its width.

3. The modular jack of claim 1 wherein each of said contact terminals includes a pair of unitary-structured contact means for contact with said two signal lines inserted therebetween.

4. The modular jack of claim 1 wherein said insulating body has at least two through holes made in its said one face for passing therethrough said two signal wires to be interconnected, each of said at least two through holes intercommunicating with one of said housing compartments, and a plurality of insulating covers each of which includes a plate portion having at least two elongated holes opposite said at least two through holes for passing therethrough said two signal wires, said insulating covers being slidably mounted on said one face of said insulating body, each of said at lest two elongated holes defining a first width above the corresponding one of said at least two through holes when said insulating cover lies at a first position and defining a second width above said corresponding through hole when said insulating cover assumes a second position when it has been slid to said second position from said first position.

5. The modular jack of claim 1 wherein both sides of said valley define guide grooves for guiding said legs of said shielding lug, said locking means being provided in said guide grooves.

6. The modular jack of claim 1, 2, or 5 wherein of the bottom of said valley is sloped so that it becomes deeper toward the center thereof.

7. A modular jack comprising:
    a substantially rectangular parallelepipedic insulating body which has a plurality of housing compartments formed inside thereof and at least two through holes made in one face thereof for passing therethrough at least two signal wires of two cables to be interconnected;
    a plurality of contact terminals each housed in one of said housing compartments and having a pair of unitary-structured resilient holding portions for holding therebetween said at least two signal wires passed through said at least two through holes; and
    a modular block attached to another face of said insulating body, for housing a plurality of contacts connected to said plurality of contact terminals, respectively, and for receiving the mating modular plug;
    each of said plurality of contact terminals having a pair of unitary-structured movable spring pieces bent at one end into a U-shape and a pair of unitary-structured receiving spring pieces contacted at one face with edges of the free ends of said pair of movable spring pieces to form said resilient holding portion, said movable spring pieces and said receiving spring pieces being coupled at their bases to each other,
    and each of said contact terminal having a drive spring piece extending between said pair of receiving spring pieces from their coupling portion and having a free end portion bent in a U-shape and lugs protruding toward each other from opposed marginal edges of the free end portions of said pair of movable spring pieces away from said pair of receiving spring pieces when said drive spring piece is displaced;
    said insulating body having in its said one face a plurality of slots which communicate with at least one of said plurality of housing compartments, and an insulating cover having a leg portion capable of displacing said drive spring piece through one of said slots being disposed on each of said slots.

8. The modular jack of claim 7 wherein said insulating covers are each mounted on a recess formed in said one face of said insulating body in a manner to be slidable in parallel to said one face, stepped portion means being provided which holds said insulating cover at a predetermined height when it lies at a first position in said recess and which permits said insulating cover to be pressed down from said predetermined height by a predetermined distance when it lies at a second position after having slid thereto from said first position.

9. A modular jack comprising:
    a substantially rectangular parallelepipedic insulating body which has a plurality of housing compartments formed inside thereof and at least two through holes in one face thereof for passing therethrough at least two signal wires of two cables to be interconnected;
    a plurality of contact terminals each housed in one of said housing compartments, for connection to said two signal wires inserted through said through holes;
    an insulating cover which has a plate portion having at least one elongated hole opposite a corresponding one of said through holes, for passing therethrough said two signal wires, and slidably mounted on said one face of said insulating body, said elongated hole defining a first width above said corresponding through hole when said insulating cover lies at a first position and defining an narrower width above said corresponding through hole when said insulating cover lies at a second position after having slid thereto from said first position; and
    a modular block attached to another face of said insulating body and having housed therein a plurality of contacts connected to said contact terminals and for receiving the mating modular plug;

at least one of said insulating body and said insulating cover having stepped portion means which defines a gap between the underside of said plate portion of said insulating cover and said one face of said insulating body when said insulating cover lies at said second position and which permits said plate portion of said insulating cover to be pressed down toward said one face of said insulating body when said insulating cover lies at said first position; said one face of said insulating body having a slot therein adjacent said through holes leading to said housing compartments; said insulating cover having a leg portion which extends from the underside of said plate portion down to said housing compartments and is received in said slot; and each of said contact terminals having first and second spring means disposed opposite each other for holding therebetween said signal wires, and drive means which is actuated by said leg portion of said insulating cover through depression of said plate portion when said insulating cover lies at said second position and drives said first and second spring means apart.

10. The modular jack of claim 9 wherein at least one pair of said through holes are provided at either side of said slot; at least one pair of said elongated holes corresponding to said at least one pair of through holes are provided in said plate portion of said insulating cover corresponding to said slot; and said leg portion of said plate portion is disposed so that it can simultaneously actuate said drive means of two contact terminals housed in the corresponding two housing compartments.

11. The modular jack of claim 9 wherein at least one pair of said through holes are provided in communication with the corresponding one housing compartment at least at one side of said slot; said plate portion of said insulating cover corresponding to said slot has made therein said elongated holes in pairs corresponding to at least one pair of said through holes; and said contact terminal housed in each of said housing compartment includes, corresponding to at least one pair of said through holes, a pair of said first spring means formed as a unitary structure and a pair of said second spring means formed as a unitary structure with said first spring means.

12. The modular jack of claim 9 or 11 wherein said plate portion of said insulating cover has a slit extending across each of said elongated holes in parallel to the direction in which said insulating cover is slid and sliding press means is provided between each marginal edge of said plate portion and said one face of said insulating body, said sliding press means pressing each marginal edge of said plate portion to narrow said elongated holes when said insulating cover lies at said second position and removing the pressure to each marginal edge of said plate portion when said insulating cover lies at said first position.

13. The modular jack of claim 9, 10, or 11 wherein said insulating covers are each formed of transparent resin.

14. The modular jack of claim 9, 10, or 11 wherein said insulating body has a valley formed in its said one face across the central portion thereof for housing stacked end portions of said two cables to be interconnected and at least one pair of locking means formed at either side of said valley, and a metal shielding lug having a press portion of about the same width as that of said valley and at least one pair of legs extending from both ends of said press portion substantially at right angles thereto and having at their free ends engaging portions for engagement with said locking means.

15. The modular jack of claim 9, 10, or 11 wherein said insulating body has in said one face thereof a recess on which said plate portion of said insulating cover is slidably mounted.

* * * * *